US012296362B2

(12) United States Patent
Stroup

(10) Patent No.: US 12,296,362 B2
(45) Date of Patent: May 13, 2025

(54) METHOD AND APPARATUS FOR CREATING AND MAINTAINING A VIBRATING SCREENING MACHINE BY UTILIZING STACKABLE SCREEN DECKS

(71) Applicant: Terex USA, LLC, Norwalk, CT (US)

(72) Inventor: David Bryan Stroup, Burt, MI (US)

(73) Assignee: Terex USA, LLC, Norwalk, CT (US)

( * ) Notice: Subject to any disclaimer, the term of this patent is extended or adjusted under 35 U.S.C. 154(b) by 88 days.

(21) Appl. No.: 18/132,631

(22) Filed: Apr. 10, 2023

(65) Prior Publication Data

US 2023/0321691 A1 Oct. 12, 2023

Related U.S. Application Data

(60) Provisional application No. 63/328,831, filed on Apr. 8, 2022.

(51) Int. Cl.
*B07B 1/46* (2006.01)
*B07B 1/42* (2006.01)

(52) U.S. Cl.
CPC .............. *B07B 1/4645* (2013.01); *B07B 1/42* (2013.01)

(58) Field of Classification Search
CPC .... B07B 1/28; B07B 1/42; B07B 1/46; B07B 1/4645
USPC .......................................................... 209/363
See application file for complete search history.

(56) References Cited

U.S. PATENT DOCUMENTS

| | | | | |
|---|---|---|---|---|
| 2,285,678 A * | 6/1942 | Overstrom | B07B 1/44 209/365.3 |
| 2010/0000914 A1* | 1/2010 | Fallon | B07B 1/42 209/365.4 |
| 2019/0070637 A1* | 3/2019 | Boothe | B07B 1/4609 |
| 2019/0366243 A1* | 12/2019 | Colgrove | B07B 1/4609 |
| 2023/0321691 A1* | 10/2023 | Stroup | B07B 1/46 209/363 |

* cited by examiner

*Primary Examiner* — Terrell H Matthews
(74) *Attorney, Agent, or Firm* — Simmons Perrine Moyer Bergman PLC

(57) ABSTRACT

A configurable modular stackable multi-deck material processing screening machine which includes a plurality of stackable screen deck sections, each having a first side structural vertical wall segment, and a stackable drive section having a stackable drive section first side structural vertical wall segment 1201. Where all of the stackable screen deck sections can be installed, removed and replaced without need to lower or lift a screen deck between vertical structural walls that support a draft shaft with eccentrics coupled thereto and past a portion of these vertical structural walls that previously supported a screen deck. Also each of the first side structural vertical wall segments, and the stackable drive section first side structural wall segment are not inseparable portions of a wall that supports a drive shaft and eccentrics.

12 Claims, 4 Drawing Sheets

METHOD AND APPARATUS FOR CREATING AND MAINTAINING A VIBRATING SCREENING MACHINE BY UTILIZING STACKABLE SCREEN DECKS

CROSS REFERENCE TO RELATED APPLICATIONS

The present application claims the benefit of the filing date of provisional patent application having Ser. No. 63/328,831 filed on Apr. 8, 2022 by the same inventor, which application is incorporated herein in its entirety by this reference.

FIELD OF THE INVENTION

The present invention generally relates to material processing, and more particularly relates to vibrating screening machines, and even more particularly, relates to multi-deck screening machines.

BACKGROUND OF THE INVENTION

In the past, various methods and structures for supporting screening media or screen cloths have been used in a wide variety of applications.

A common triple deck design of the past, such as a Cedarapids®, A TEREX brand, screen includes three prefabricated deck weldments, of the same design, for supporting various sizes and types of screening media. These decks were typically lowered from the top down between two vertical structural parallel sidewalls of the triple-deck screen, starting with the smallest screen media opening size. Then the drive, shaft(s) and eccentric portions of the screening machine are installed. Then the remaining decks are installed, starting the remaining deck with the smallest screen media opening size. These decks were typically bolted, on each side, to their respective vertical structural side walls with horizontal bolts (when the screen deck is substantially horizontal).

While these types of support structure systems may have many advantages in particular applications, they also have some drawbacks. For example, if a lowest deck, above the drive, shafts, and eccentrics zone in a triple deck screen, needed to be replaced, it may be necessary to remove the top deck in order to properly access and replace the next lower deck. This can be particularly true if there is limited space or clearance between the decks, in such cases it would typically require the complete unbolting from the vertical structural parallel sidewalls and lifting for removal of the top deck and then the unbolting from the vertical structural parallel sidewalls and lifting for removal of the middle deck, before the bottom deck could be unbolted from the vertical structural parallel sidewalls, and lifted past the previous middle deck and top deck mounting locations and thereby be removed and replaced.

Normally, a single deck screen will always be a single deck screen. The same for double and triple deck screens. Normally, the spacing between decks would not allow additional decks to be squeezed in between the existing decks. Moreover, the size of the motors on a screen and the size of the eccentrics, in combination, normally create limitations on increasing the number of decks in a multi-deck screen.

Consequently, there exists a need for improved methods and apparatuses for efficiently installing screen decks in vibrating screen machines.

SUMMARY OF THE INVENTION

It is an object of the present invention to provide an easily implemented system for removing, installing and replacing screen decks.

It is a feature of the present invention to utilize a plurality of single screen decks each with attached vertical structural and parallel sidewalls.

It is an advantage of the present invention to provide for the ability to add an additional screen deck to an existing screening machine.

It is another advantage of the present invention to provide the ability to increase the number of decks in a vibrating screen machine which has already been completed, deployed in the field and used.

It is yet another object of the present invention to provide for more vertically compact multi-screen deck vibrating screening machines.

The present invention is an apparatus and method for efficiently and cost effectively providing an additional or replacement screen deck, which apparatus and method are designed to satisfy the aforementioned needs, provide the previously stated objects, include the above-listed features, and achieve the already articulated advantages. The present invention is carried out in a "multi-deck spanning sidewall-less" architecture, in a sense that two tall vertical sidewall, between which multiple screen decks are lowered bolted into place have been eliminated.

Accordingly, the present invention is a method of making a material processing vibrating screening machine, comprising the steps of:

providing a first stackable screen deck section 110;

providing a stackable drive section 120; and bolting the first stackable screen deck section 110 and the stackable drive section 120 together, without sliding said first stackable screen deck section 110 downward between two separate vertical structural side walls which are configured to support a drive and an eccentric.

Additionally, the present invention is a vibrating screen system comprising:

a stackable drive section 120 having a stackable drive section first side structural vertical wall segment 1201; a stackable drive section second side structural vertical wall segment 1202; a first drive shaft 124 extending therebetween, and a first drive eccentric and power provisioning segment 126;

a first stackable screen deck section 110 having a first side structural vertical wall segment 1101 and a second side structural vertical wall segment 1102; and said first side structural vertical wall segment 1101 and said stackable drive section first side structural vertical wall segment 1201 are not inseparable portions of a unified structural vertical wall.

BRIEF DESCRIPTION OF THE DRAWINGS

The invention may be more fully understood by reading the following description of the preferred embodiments of the invention, in conjunction with the appended drawings wherein.

DETAILED DESCRIPTION

Although described with particular reference to inclined multi-level vibrating screens, the systems and methods of the present invention can be implemented in many different types of vibrating screen applications, such as multi-shaft horizontal screens.

In one embodiment, the system and method of the present invention described herein can be viewed as examples of many potential variations of the present invention which are protected hereunder, the following details are not intended to limit the legal scope of the invention unless they are included within the enumerated patent claims.

Figure 1:
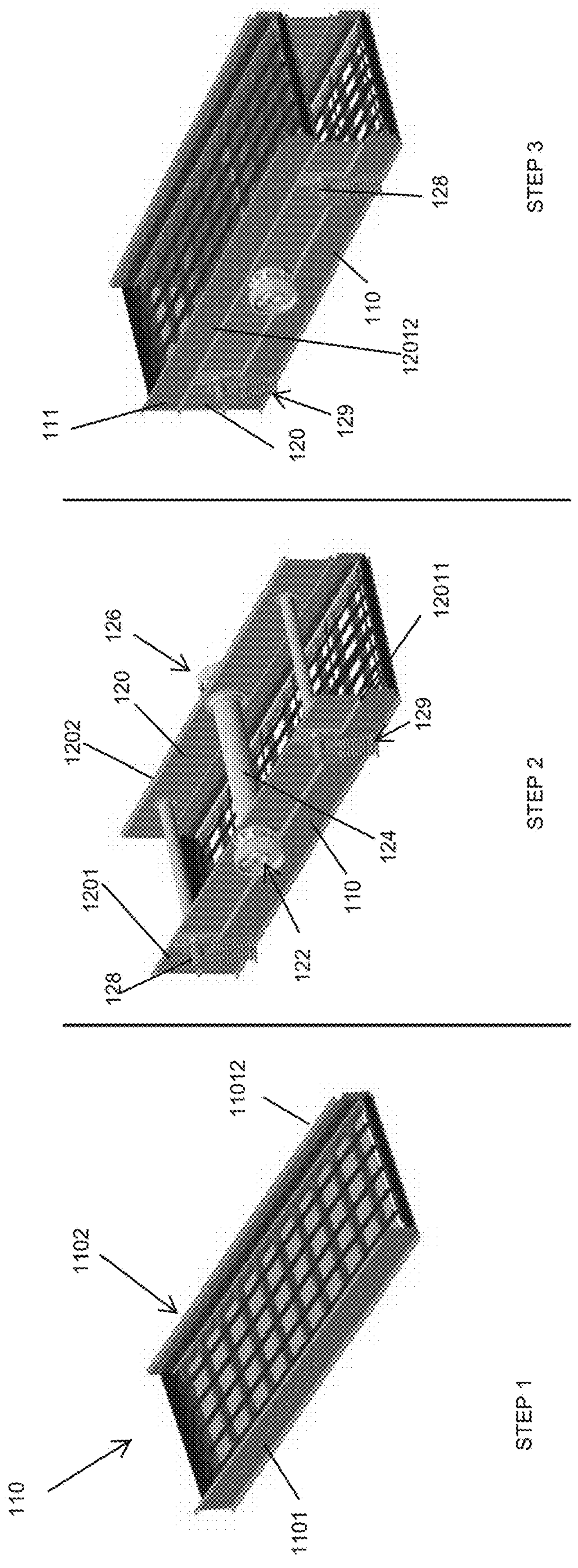
FIG. 1 is a graphical flow diagram illustrating the steps of the method of the present invention for assembling a working multi-deck vibrating screening machine.

Now referring to the drawings, wherein like numerals refer to like matter throughout, and more particularly FIG. 1, there is shown a series of steps, where each successive step has an additional stackable component added on top of the earlier configuration.

Step 1 is to provide a first stackable component, in this case it is a screen deck 110. This is because it is known that there will be two or more decks. If a single deck is going to be used, then the first stack component would be the drive section 120 of Step 2. The details of the stackable screen deck section 110 will be described in more detail when describing FIG. 4.

Step 2 shows the intermediate stage of assembly with the stackable drive section 120 disposed on top of the stackable screen deck section 110. Stackable drive section 120 has stackable drive section first side structural vertical wall segment 1201 and stackable drive section second side structural vertical wall segment 1202. In Step 2 stackable drive, section 120 is lowered as a single unit onto stackable screen deck section 110 where all of the weight of stackable drive section 120 is supported by first side structural vertical wall segment 1101 and second side structural vertical wall segment 1102. Also shown is first drive 122 which includes first drive shaft 124 and first drive eccentric/power provisioning segment 126. In this single shaft, inclined screen embodiment, the first drive eccentric/power provisioning segment 126 represents well known mechanisms for driving the first drive shaft 124 and/or including eccentrics as are well known in the art. Similarly, adjustable trunnions 128, for easy angle adjustment, and springs 129 are also shown. The stackable drive section 120 can be overhead or underslung depending on the specific application, shown here as overhead. The stackable drive section 120 can be bolted to stackable screen deck section 110 in different ways including using vertical bolts extending between a first side structural vertical wall segment top horizontal portion 11012 and a lower portion of stackable drive section 120, or an additional vertical plate spans the interface therebetween and is bolted with horizontal bolts to each of the stackable screen deck section 110 and stackable drive section 120 in a suitable manner. This additional vertical plate could be either on the inside or the outside. First side screen deck structural vertical wall segment top horizontal portion 11012 could be bolted with vertical bolts to first side drive section structural vertical wall segment bottom horizontal portion 12014.

Step 3 shows the structure of Step 2 plus an additional stackable screen deck section 111 disposed on top of first side drive section structural vertical wall segment top horizontal portion 12012. Stackable screen deck section 110 and stackable screen deck section 111 could be made to identical designs or they could be made with structures tailored to a specific type of screen material or size opening. For example, if stackable screen deck section 111 is specifically made for use as a top level stackable screen deck section and with much larger screen opening size, it may be desirable to have the screen deck weldment to be made to withstand impacts from larger stones than would be necessary for a bottom lever stackable screen deck section. The size and space of the support structures of the screen deck weldment could be also specific for certain types of screen media.

Figure 2:
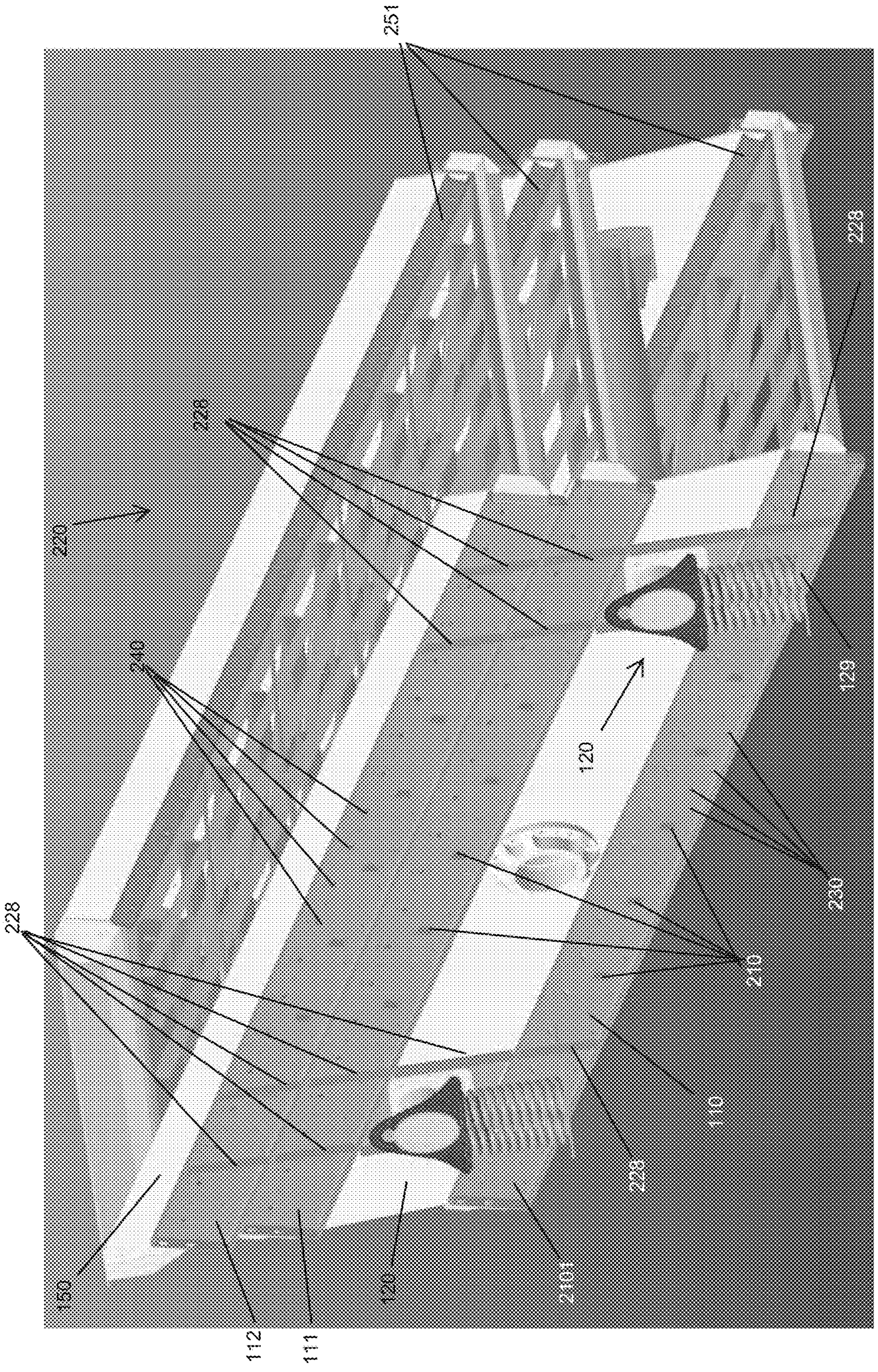
FIG. 2 is a perspective view of a triple deck screening machine of the present invention.

Now referring to FIG. 2, there is shown a perspective view of the structure of Step 3 of FIG. 1 with an addition stackable screen deck section 112 attached above and slightly shifted along stackable screen deck section 111. Also shown is containment barrier 150. Stackable drive section 120 is very similar to FIG. 1, except that first drive eccentric/power provisioning segment 126 is not shown. Stackable screen deck section 110 is shown in FIGS. 2-4 with a slightly modified version where there is a trunnion force transmitting structures 228, lower staggered row of bolt holes 230, upper staggered row of bolt holes 240, and internal longitudinal connecting members 251.

Figure 3:
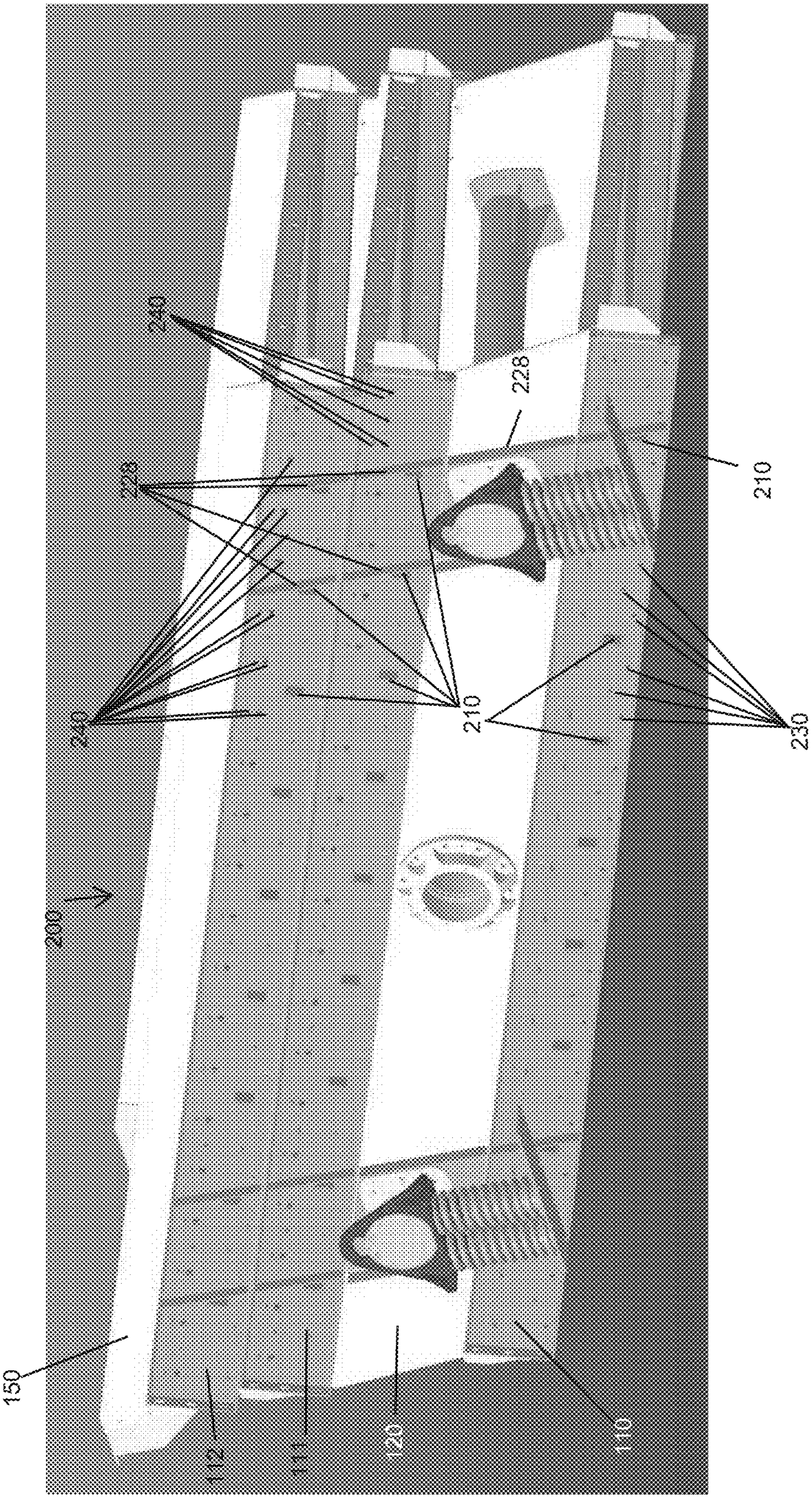
FIG. 3 is an alternate view of the triple deck screening machine of FIG. 2.

Now referring to FIG. 3, there is shown an alternate perspective of the triple deck screening machine 200 of FIG. 2.

Figure 4:
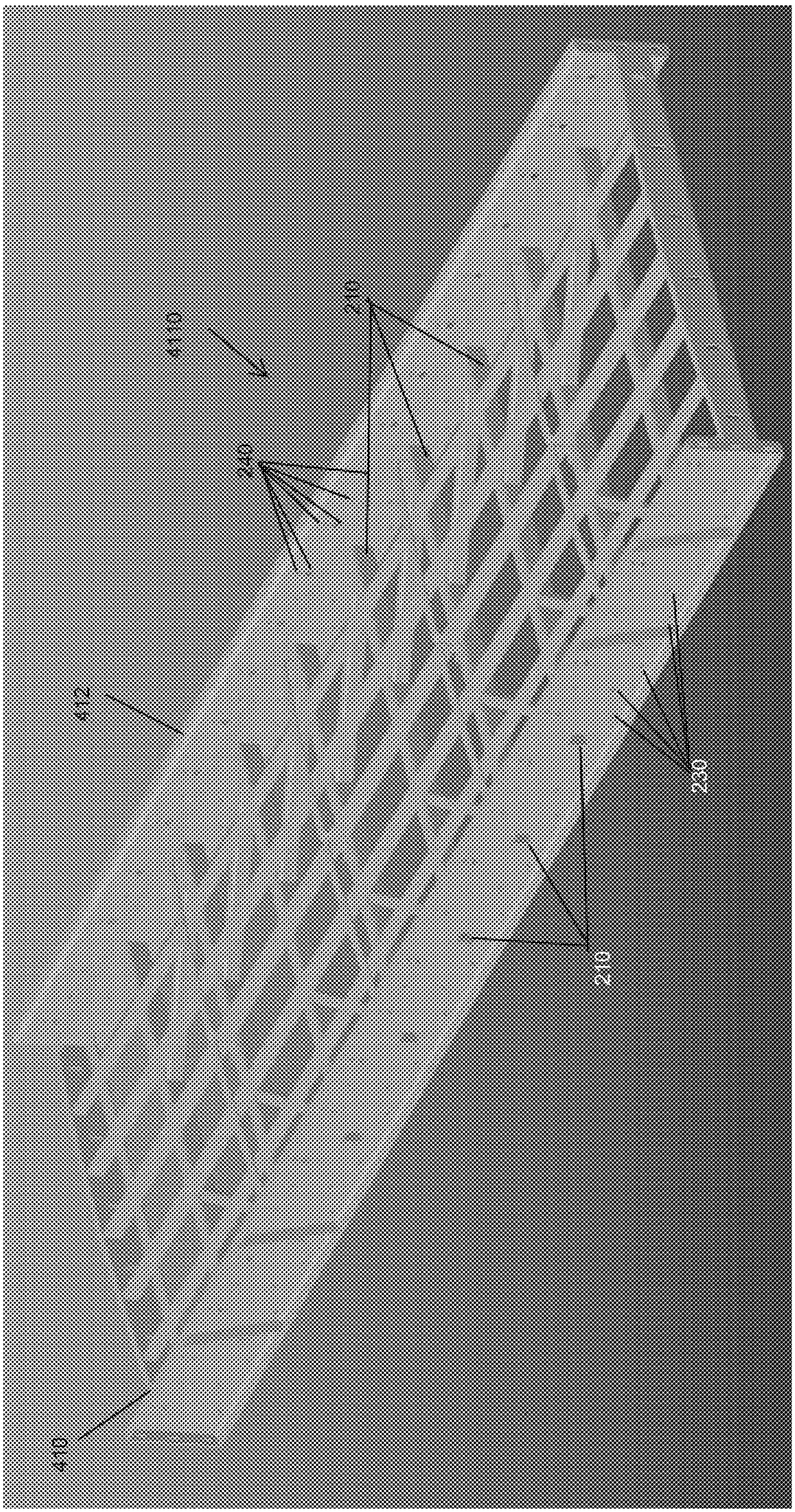
FIG. 4 is a detailed view of a representative screen deck of FIGS. 2 and 3.

Now referring to FIG. 4, there is shown stackable screen deck section 4110 which is an alternate version of stackable screen deck section 110 of FIG. 1, which includes a first side structural vertical wall segment 410 and a second side structural vertical wall segment 412 with a plurality of deck transverse members 210 therebetween. The end portions of deck transverse members 210 are shown here extending into holes in first side structural vertical wall segment 410 and second side structural vertical wall segment 412. Stackable screen deck section 4110 could be a weldment with no bolts used internally to hold it together. However, stackable screen deck section 4110 is shown, for coupling to other structures, lower staggered row of bolt holes 230, and upper staggered row of bolt holes 240. In an alternate embodiment, portions of stackable screen deck section 4110 could be held together with bolts or other detachable connecting mechanisms to provide access for maintenance and screen cloth replacement.

It should be understood that it may be possible to add an additional stackable screen deck section above stackable screen deck section 112 (FIGS. 2 and 3) by replacing the eccentrics with those more suitable. Alternatively, the stackable drive section 120 could be replaced with a multi-shaft stackable drive section, or a single shaft stackable drive section with a larger drive motor and/or eccentrics.

If a material processing contractor customer has needs that have evolved over time, an existing vibrating screening machine could be altered by substituting new stackable drive sections and utilizing the same stackable screen deck sections.

The precise implementation of the present invention will vary depending upon the particular application.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A method of making a material processing vibrating screening machine, comprising the steps of:

providing a first stackable screen deck section;

providing a stackable drive section; and bolting the first stackable screen deck section and the stackable drive section together, without sliding said first stackable screen deck section downward between two separate vertical structural side walls which are configured to support a drive and an eccentric.

2. The method of claim 1 wherein the first stackable drive section is above the stackable screen deck section.

3. The method of claim 2 where the step of bolting is done using vertical holes in a first side screen deck structural vertical wall segment top horizontal portion and vertical holes in a first side drive section structural vertical wall segment bottom horizontal portion.

4. The method of claim 3 further comprising the steps of:

providing a second stackable screen deck section; and bolting the second stackable screen deck section and one of the stackable drive section and the first stackable screen deck section, together, without sliding said second stackable screen deck section downward between two separate vertical structural side walls which are configured to support a drive and an eccentric.

5. The method of claim 4 further comprising the step of: providing a third stackable screen deck section; and bolting the third stackable screen deck section and the second stackable drive section, together, without sliding said third stackable screen deck section downward between two separate vertical structural side walls which are configured to support a drive and an eccentric.

6. The method of claim 5 wherein said second stackable screen deck section is replaced without being lifted between two separate vertical structural side walls which are configured to support a drive and an eccentric.

7. A method of making a material processing vibrating screening machine, comprising the steps of:

providing a first screen deck section;

providing a drive section; and coupling the first screen deck section and the drive section together, without sliding said first screen deck section downward between two separate structural walls which are configured to support a drive and an eccentric.

8. The method of claim 7 wherein the first drive section is above the screen deck section.

9. The method of claim 8 where the step of coupling is done using vertical holes in a first side screen deck structural vertical wall segment top horizontal portion and vertical holes in a first side drive section structural vertical wall segment bottom horizontal portion.

10. The method of claim 9 further comprising the steps of:

providing a second screen deck section; and coupling the second screen deck section and one of the drive section and the first screen deck section, together, without sliding said second screen deck section downward between two separate vertical structural side walls which are configured to support a drive and an eccentric.

11. The method of claim 10 further comprising the step of: providing a third screen deck section; and coupling the third screen deck section and the second drive section, together, without sliding said third screen deck section downward between two separate vertical structural side walls which are configured to support a drive and an eccentric.

12. The method of claim 11 wherein said second screen deck section is replaced without being lifted between two separate vertical structural side walls which are configured to support a drive and an eccentric.

* * * * *